United States Patent [19]

Pierson et al.

[11] Patent Number: 4,626,856

[45] Date of Patent: Dec. 2, 1986

[54] RADAR SIGNAL CORRECTION SYSTEM

[75] Inventors: Willis A. Pierson, Weatherford; James D. Hill, Dallas; Vedon W. Otto, Burleson, all of Tex.

[73] Assignee: General Dynamics Corporation, Fort Worth, Tex.

[21] Appl. No.: 542,115

[22] Filed: Oct. 14, 1983

[51] Int. Cl.[4] .................................................. G01S 7/40
[52] U.S. Cl. .................................... 342/174; 342/189; 342/199; 342/195
[58] Field of Search ................ 343/5 DP, 7.7, 17.1 R, 343/17.7, 17.5, 5 AF, 5 ST, 7.5

[56] References Cited

U.S. PATENT DOCUMENTS

| | | | |
|---|---|---|---|
| 2,881,321 | 4/1959 | Dauksher et al. | 343/5 AF |
| 3,950,750 | 4/1976 | Churchill et al. | 343/17.7 |
| 3,993,996 | 11/1976 | Milan | 343/7.7 X |
| 3,995,271 | 11/1976 | Goggins, Jr. | 343/7.7 X |
| 4,021,804 | 5/1977 | Dounce et al. | 343/17.1 R |
| 4,040,055 | 8/1977 | Donahue et al. | 343/5 DP X |
| 4,071,844 | 1/1978 | Hopwood et al. | 343/5 AF X |
| 4,095,224 | 6/1978 | Dounce et al. | 343/17.1 R |

OTHER PUBLICATIONS

An Analysis of the Factors Which Determine Signal/-Noise Discrimination in Pulse-Carrier Systems by D. O. North Proceedings of the IEEE, Jul.-1963.
Impact of Extremely High Speed Technology on Radar System Performance by E. K. Reedy et al.,—Georgia Institute of Technology—1982.

Primary Examiner—T. H. Tubbesing
Assistant Examiner—John B. Sotomayor
Attorney, Agent, or Firm—Charles E. Schurman; James E. Bradley

[57] ABSTRACT

A radar correcting system has features for providing a corrected radar receiver reflection to a Doppler process unit. The corrected receiver pulse accounts for variances in phase, amplitude and frequency of the transmit pulses. The system has a phase detector that detects the phase difference between a stable oscillator and the transmit signal, providing a complex video or real and imaginary outputs. An operator that will normalize the transmit pulse is determined. The operator is applied to the reflections received by the receiver antenna to remove from the reflections any vagaries due to varieties in the transmit pulses. The data proceeding to the processor deals only with the objects causing the radar reflection.

8 Claims, 12 Drawing Figures

AMPLITUDE ERROR

FREQUENCY ERROR

PHASE ERROR

RADAR SIGNAL CORRECTION SYSTEM

BACKGROUND OF THE INVENTION

1. Field of the Invention

This invention relates in general to radar systems, and in particular, to a unit for use with magnetron radar transmitters which will correct receiver signals for transmitter output errors.

2. Description of the Prior Art

Radar systems in general send radio frequency waves out from a transmitter. If these waves contact an object, the waves will be reflected back and may be received by a receiver. The reflected signal can be analyzed to determine the size, range and velocity of the object. The amplitude of the waveform received indicates the size of the target or object. The time delay indicates the range or distance to the target. The change in frequency indicates the velocity of the target.

Generally, the radio frequency signals are high frequency energy bursts or pulses; for example three gigahertz ($3 \times 10^9$ cycles per second) for a pulse period, followed by an off duty period, then followed by another pulse of the same length, frequency and duration. If the receiver antenna is pointed high into the air, where any type of reflected wave would indicate a flying object, then the reflected waveform can be analyzed to determine the nature of the target. However, low flying aircraft could fly below the radar antenna pattern if the receiver is pointed high into the air, and the receiver would not be able to detect the presence of the aircraft. Pointing the receiver at a low angle so as to avoid missing low flying aircraft creates other problems. The receiver will receive reflected signals possibly due to trees, hills, mountains, buildings and other non-flying objects. The reflected signal due to these objects is called clutter. Clutter is often orders of magnitude larger than the signals of interest, and imparts no information to the system of value, and obscures the signals which do bear information.

Systems are available to determine what part of the reflected signal is due to clutter and what part is due to a flying object, if any. The pulse envelopes being received are compared. If sequential received pulses are substantially identical in frequency, then the reflections are all due to stationary objects. Moving objects will cause a variance between pulse frequency. In the past, to be able to compare these pulses and determine which is clutter, the system must have a very stable transmitter. The transmitter must produce substantially identical pulses in phase, frequency and amplitude. High power systems that do this normally employ a klystron transmitter. The processing which separates the clutter is known as phase dependent processing.

The klystron systems work well, but they are expensive, bulky and inefficient in power compared to older systems which employ magnetron transmitters. The magnetron is a tube system employing very high energy to generate the radio frequency signals. The trouble with the magnetron is that the pulse envelopes transmitted vary from one another in frequency, amplitude and phase. Consequently, a phase dependent processing unit cannot separate out the clutter very well. The pulses being received by the receiver, even if reflected from a stationary object, will not be sustantially identical because the transmitted pulses transmitted by the magnetron are not identical. Some magnetron systems employ features to improve the stability of the transmitted signal. For example, one technique known as COHO injection employs a stable transmitter as a primer for the magnetron to initiate a more stable output. Another prior art technique, known as COHO locked, is one in which some of the instabilities of the transmitter are impressed on the otherwise stable receiver to effect cancellation of those instabilities on receive. However, the rejected clutter performance even with these systems is far worse than the klystron systems.

SUMMARY OF THE INVENTION

In this invention, the transmitter output is not changed, but is allowed to remain unstable. As each pulse is being transmitted by the transmitter, multiple samples are taken of the pulse and fed into a correction unit. The correction unit looks at the amplitude, frequency and phase of the transmitted waveform and determines an operator which will normalize the amplitude, frequency and phase. This mathematical operator, if applied to the transmitter signal would appear to make it stable. The reflection received by the receiver is the image of the transmitted waveform, shifted in time and amplitude depending upon the target that caused the reflections. The operator that is determined from sampling the transmitted signal is applied to the receiver signal to normalize the receiver's signal. This corrects the received signal for any vagaries in the transmitted pulse.

In order to realize this process, the transmitted signal is sampled and mixed down to base band or quadrature video. In this form, the transmitted pulse has its amplitude preserved and time delay is converted into a phase shift that is linearly proportional to range. The video will have a real output and an imaginary output which are stored in a temporary storage means. The real and imaginary outputs are also stored in a frequency and phase coefficient memory unit in time reverse order. The data in the operator coefficient unit and the transmit storage unit are then correlated by multiplying the values point for point and accumulating the products. This defines an amplitude variable. A reciprocal is taken of the amplitude variable, which is then multiplied against the data in the operator coefficient unit to provide an amplitude, frequency and phase operator coefficient.

The receiver has its reflected signal also beat in quadrature against the signal from the stable oscillator. A correlator multiplies the received data against the operator coefficient on a point per point basis, which is then accumulated to provide a corrected signal for a Doppler processor unit. The stable oscillator has a feedback system for tuning its frequency to a point near the average transmitted frequency of a number of pulses.

DESCRIPTION OF THE PREFERRED EMBODIMENT

Figure 1:
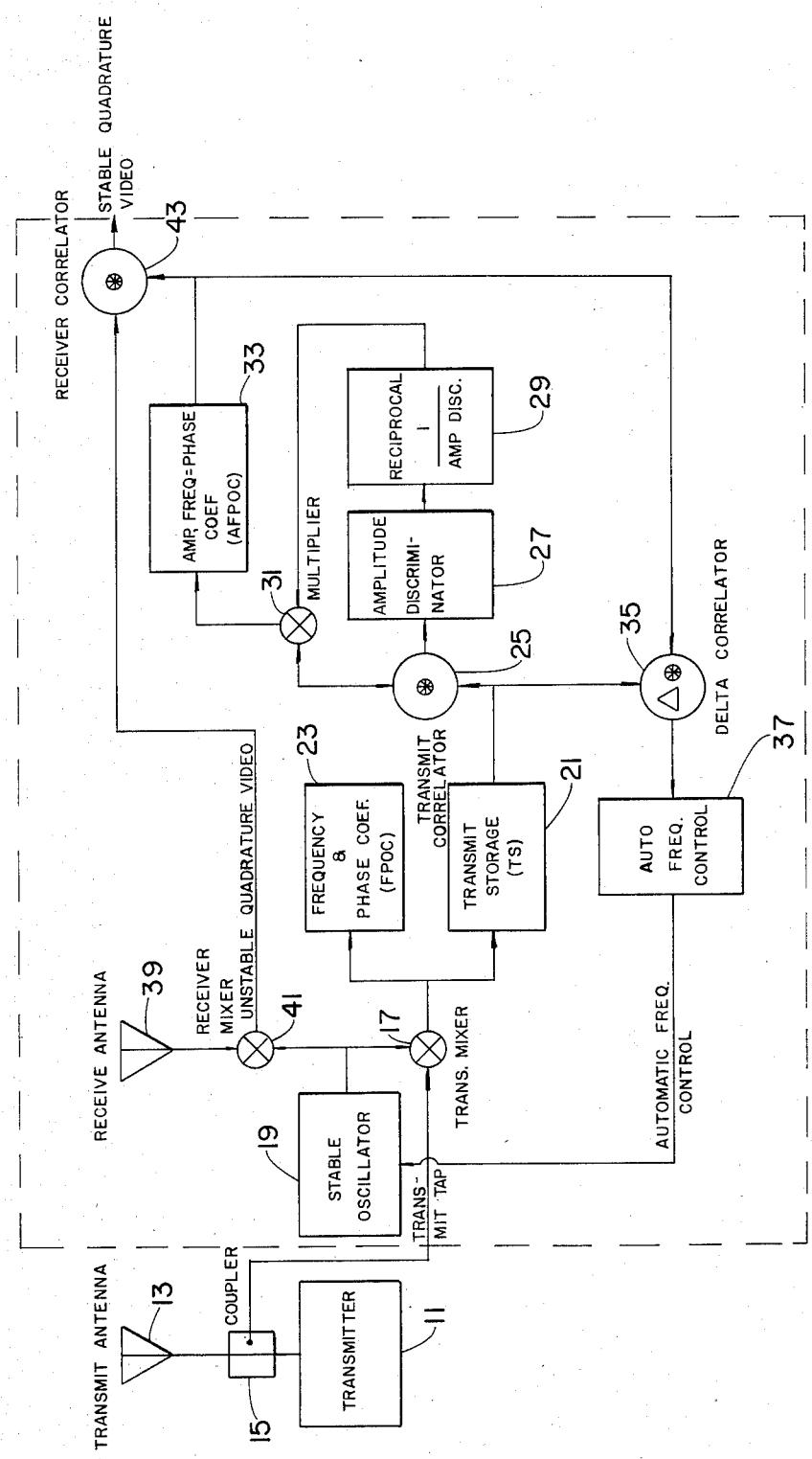
FIG. 1 is a block diagram illustrating the theory of the operation of a radar system incorporating a digital stabilization unit constructed in accordance with this invention.

Referring to FIG. 1, the process starts when the transmitter 11 emits an RF (radio frequency) pulse to the transmit antenna 13 and out into the air. On its way to the antenna, the transmit pulse passes through a coupler 15, which redirects a small portion of the energy or waveform down through a transmitter tap to a transmitter mixer 17. An oscillator means 19 is provided for providing a very stable reference that can be tuned or varied. The signal of oscillator 19 is also applied to the transmitter mixer 17. The oscillator 19 frequency is fairly close to the transmitter 11 frequency, and mixing the two in mixer 17 will result in what is known as quadature or complex video. The complex video will have a frequency that is the difference between the frequency of the transmit pulse from transmitter 11 and the oscillator 19 frequency. Additionally, the video will likely have a random starting phase and a randomly distributed amplitude, since this is characteristic of the RF emitted by transmitter 11.

Figure 4:
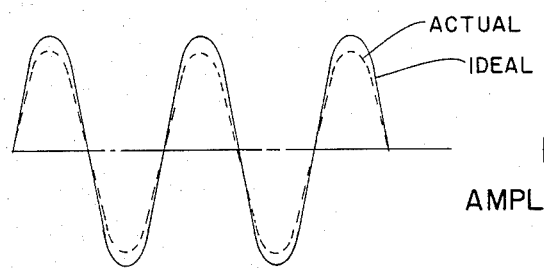
FIG. 4 is a schematic of a radar transmitter pulse having amplitude error.
Figure 5:
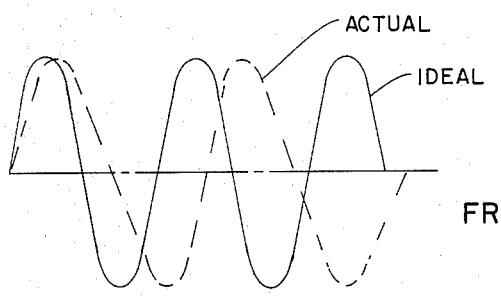
FIG. 5 is a schematic of a radar transmitter pulse having frequency error.
Figure 6:
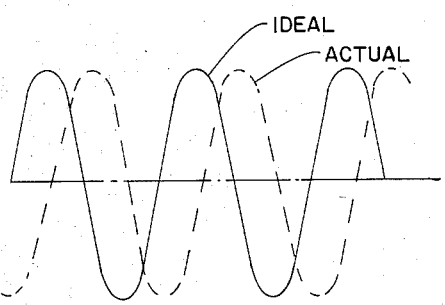
FIG. 6 is a schematic of a radar transmitter pulse having phase error.

These transmitter variances may be better understood by referring to FIG.'s 4–6. The waveforms as shown therein are greatly exaggerated, but are shown to indicate a transmitted pulse from the transmitter, and how it will vary from pulse to pulse. As shown in FIG. 4, the ideal amplitude is shown in solid, but the actual amplitude of the emitted pulse from transmitter 11 may have a lower or higher amplitude than ideal. This actual amplitude shown by the dotted lines, is possibly different from the pulse immediately preceding and the pulse following. Referring to FIG. 5, the actual waveform, shown in dotted lines, may have the proper amplitude, but it may be of a different frequency than ideal. The dotted lines show the frequency in the pulse to be greater than the ideal. The frequency within a pulse will be fairly constant, but the frequency between different pulses will likely vary. In FIG. 6, it is possible to have the proper frequency and amplitude, but the transmitter 11 may start the pulse at a phase other than at zero, as indicated by the ideal. The dotted lines show that an actual signal may have a pulse starting later or earlier than the ideal. Each transmitted pulse will likely have amplitude, phase, and frequency error to some degree.

Figure 7:
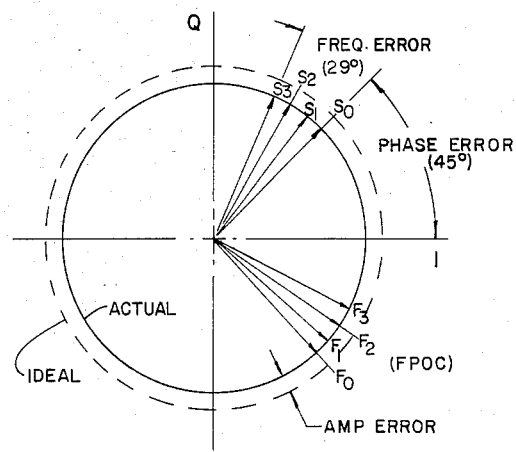
FIG. 7 is a vector representation of four samples of a radar transmitter pulse having phase, frequency and amplitude error and the four coefficients for phase frequency correction.

The transmitter mixer 17, as shown in FIG. 1, will preserve these errors, which can be expressed in a vector form, as shown in FIG. 7. In FIG. 7, the I axis represents real output, and the Q axis represents imaginary. The vector lines labeled $S_0$ through $S_3$ indicate four samples taken during a single transmit pulse. Each vector $S_0$–$S_3$ rotates about the I/Q axis 360° for each sine wave. These lines represent the difference in frequency and phase between the oscillator 19 signal with which it is mixed, and also represent amplitude error. The representation on the I/Q axis is accomplished by mixing the oscillator signal in phase with the transmit pulse to provide the I or real value, and shifting the oscillator signal 90 degrees out of phase and mixing it with the transmitted signal to provide the imaginary or Q value. This is known as quadrature, and yields complex video or imaginary and real outputs.

Still referring to FIG. 7, if the transmitted pulse were completely ideal, the length of each arrow $S_0$ through $S_3$ would extend to the dotted circle, which is the ideal amplitude, rather than the solid circle, which is the actual. The difference is the amplitude error. If the frequency of the transmitter 11 within the pulse perfectly matched the oscillator 19 frequency, the vector components $S_0$ through $S_3$ would all lie on top of each other. As shown, there is a frequency error, which is the distance between the first sample $S_0$ and the last sample $S_3$, which for example, is shown as 24 degrees.

The phase error is the distance from the desired starting point, preferably zero degrees to the point at which the transmitter 11 pulse starts, which is $S_0$ and is shown for example to be 45 degrees. If the transmitted pulse had no amplitude, frequency or phase error, it would lie on the positive I axis. The transmitter mixer 17 thus serves as phase detector means for determining the difference in phase and frequency between the stable oscillator signal and a transmit pulse, and for providing a real output and an imaginary output containing the phase and frequency difference and containing the amplitude of the transmit signal. The components of the mixer 17 are conventional.

The real and imaginary outputs of the transmitter mixer 17 are digitized by an analog to digital converter, which provides 16 digital outputs or samples per pulse from the transmitter 11. This information is stored in a random access memory (RAM) unit called a transmit storage or TS unit 21. The information is simply stored in sequential order for retrieval subsequently. The same data is also routed to another RAM, called herein a frequency and phase coefficient unit (FPOC) 23. The information is stored in the FPOC 23 in a time reverse order, or in the opposite sequential order.

Figure 8:
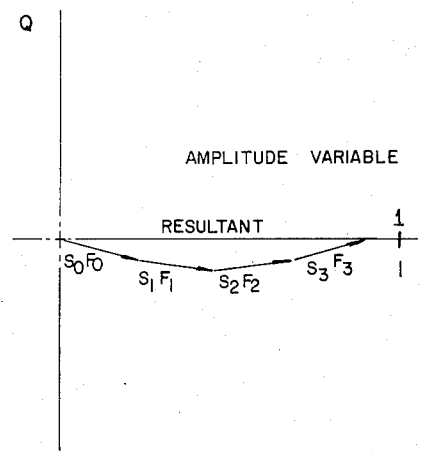
FIG. 8 is a vector representation of the correlation of the samples with the correction vectors contained in FIG. 7.

The data stored in the TS 21 and the FPOC 23 is correlated by a transmit correlator 25. The transmit correlator 25 takes the two inputs, point by point, and multiplies them together, then adds these products together. The correlator 25 is made up of conventional multiplying and summing electronic circuits. This occurrence can be visualized by again referring to FIG. 7. The vectors $F_0$, $F_1$, $F_2$ and $F_3$ represent four samples that have been stored in inverse time order in the FPOC 23. Actually 16 samples are taken. Each vector $F_0$–$F_3$ is a congugate of one of the vectors $S_0$–$S_3$. The correlating function of the transmit correlator 25 is represented in FIG. 8. The $S_0$ vector is multiplied times the $F_0$ vector, the $S_1$ vector is multiplied times the $F_1$ vector and so on. Each vector product is added to the other vector products to provide a resultant. This indicates an amplitude variable, with the ideal amplitude being at 1. In FIG. 8, the actual resultant amplitude is short, perhaps at 70% or so of ideal. This determines the amount of amplitude correction that will be needed.

Figure 9:
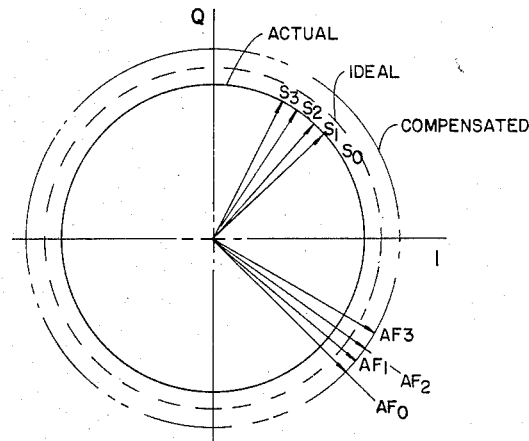
FIG. 9 is a vector representation similar to the one of FIG. 7, but the correction vectors are scaled to correct amplitude also.
Figure 10:
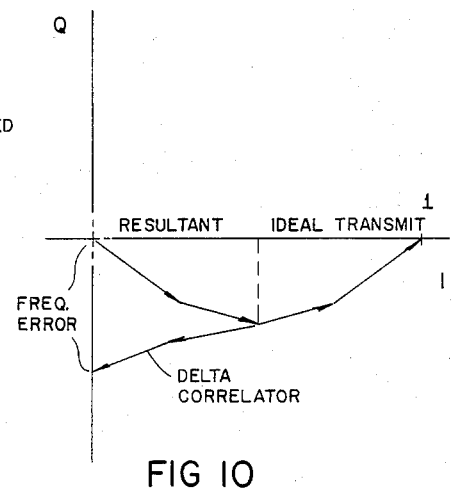
FIG. 10 is a vector representation of the in FIG. 9. The "Resultant" is an ideal transmit pulse. Frequency error is the result of delta correlation.

Referring again to FIG. 1, the amplitude discriminator 27 is a shift or storage register that stores the resultant of FIG. 8. This value is transmitted to a reciprocal circuit 29, which is a programmable read only memory in the preferred embodiment that looks up and provides the value of the reciprocal of the amplitude variable. The reciprocal of the amplitude variable from circuit 29 is multiplied at the simple multiplier 31 times the data contained in the FPOC 23. Remember that this data is the time reverse information, and multiplying it times this amplitude variable reciprocal scales it. These products are in an amplitude, frequency and phase coefficient storage unit (AFPOC) 33. The data in the AFPOC 33, when multiplied and accumulated with the receiver signal, will provide a corrected signal, as will be explained subsequently. The multiplier 31 is a conventional unit capable of multiplying or scaling information. The function is shown in FIG. 9. The time inverse vectors have been multiplied by the amplitude variable, and are indicated herein as $AF_0$, $AF_1$, $AF_2$ and $AF_3$. Note that they now extend beyond the ideal to an over compensated circle. Computing the resultant of the vectors $AF_0$-$AF_3$ and $S_0$-$S_3$ is shown in FIG. 10. This resultant shows that the magnitude or amplitude will be 1, the ideal. Mathematical calculations will also show this result.

From AFPOC 33, the data contained therein is supplied to a delta correlation means 35 for multiplying on a point for point basis the data in the TS 21 times the data in the AFPOC 33. Then, the vector sum of the second sequential half of these products is subtracted from the vector sum of the first half of the products to produce a frequency error variable, which is a mean difference in frequency between oscillator 19 and the transmit pulse frequency. The frequency error variable indicates how far the oscillator 19 frequency is out of frequency or tune with respect to the frequency of the transmitter 11. This function can be mathematically calculated, or graphically shown, as in FIG. 10. The vectors labeled delta correlators show the second half of the products being subtracted from the first half of the products to provide a frequency error on the imaginary axis. Note that the amplitude variable computed by multiplier 31, and represented in FIG. 8, is contained only on the real axis, using only real numbers. Any imaginary components will be negligible in the computation shown in FIG. 8. Conversely any real components will be negligible in the computation of the frequency error variable shown in FIG. 10.

The delta correlator 35 provides the frequency error variable to an automatic frequency control circuit 37 of a conventional design which will vary the oscillator 19 frequency to match an average of the frequency of a number of transmit pulses. The oscillator 19 is continually tuned with each pulse cycle after the receiver reflections are corrected. Also, the frequency control circuit 37, for startup, has the ability to sweep the oscillator 19 in large steps, to approximately match the average of the transmitter 11 frequency, if the amplitude variable is very small, indicating that the oscillator 19 is far out of tune. Once the selected level of the amplitude variable in circuit 27 is exceeded, the automatic frequency control circuit 37 will fine tune with small steps such as 100 hz. Radar systems employing oscillators such as oscillator 19 are known, and automatic frequency control circuits 37 are also conventional.

All of the operation to determine an operator for the transmit pulse is done while the receiver portion of this circuit is blanked out. Once the operator has been determined the receiver antenna 39 will be enabled to receive reflected waveforms from the transmit pulse. These reflected waveforms will be images of the original RF signal transmitted by transmitter 11, altered in regard to amplitude, frequency and phase due to clutter and to moving objects of interest. The received signal is mixed in a mixer 41 in the same manner as the transmitter mixer 17. That is, it will be mixed with the stable oscillator 19 signal and beat into quadrature to provide Q and I components or complex video. This data passes directly to an analog to digital converter (not shown) and to a correlator 43.

Correlator 43 consists of a group of multipliers and adders, which will multiply on a point for point basis the data contained in the AFPOC with the data contained in the received signal. The products of the sequential point by point multiplication are then accumulated. Remember that the AFPOC 33 contains the coefficient to normalize the receiver data for amplitude, frequency and phase error. Correlator 43 removes from the received pulse the phase, frequency and amplitude error that went out with the transmit pulse. This could be mathematically shown, or it can be explained in context with the vector diagrams of FIG.'s 11 and 12.

Figure 11:
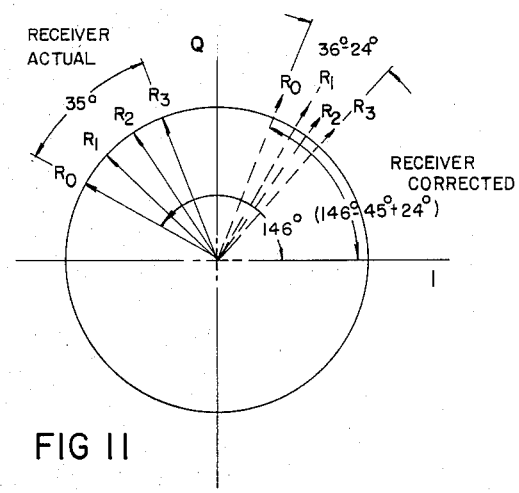
FIG. 11 is a vector representation of four samples of a hypothetical receive pulse, shown also with correcting vectors in accordance with this invention.

Referring to FIG. 11, assume that the receiver quadrature video, before correction, is sampled at four points, which can be represented by the vectors $R_0$, $R_1$, $R_2$, and $R_3$, (Actually sixteen samples are taken). Assume that the first vector is at 146 degrees, and that the spread between the first and the last vector in the pulse is 36 degrees. In the error example of FIG. 7, the transmit pulse had a 24 degree frequency error and a 45 degree phase error. The vectors labeled $R_0'$ through $R_3'$ show the receiver signal corrected for these errors. $R_0'$ has been moved back 45 plus 24 degrees from $R_0$ to account for the 45 degree phase error. The distance between $R_0'$ and $R_3'$ is compressed from the actual 36 degrees to 12 degrees by subtracting the 24 degree frequency error. The length of each vector $R_0'$ through $R_3'$ is increased to accommodate for the amplitude error shown in FIG. 7.

Figure 12:
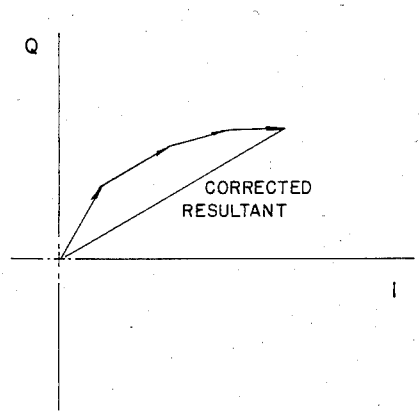
FIG. 12 is a vector representation of the correlated resultant of the samples shown in FIG. 11.

When the original receive vectors of FIG. 11 are multiplied with the AF vectors in FIG. 9 and accumulated, a corrected resultant shown in FIG. 12, will result. The resultant in FIG. 12 represents the frequency, phase and amplitude that would have occurred had the transmitter sent out an ideal transmit pulse. The information contained in FIG. 12 can be compared in a conventional Doppler processor to other reflected pulses being received by the receiver to determine what part is due to a stationary object, creating clutter, and what part is due to a moving object. If over a series of pulses, the resultants all appear to be exactly like that shown in FIG. 12, then the return will be reflected only from stationary objects and all of the information would be clutter. If a frequency, phase or magnitude change occured in the resultant of FIG. 12 from pulse to pulse, then it would indicate a moving object or target. The change in the phase is a function of distance to the target, the magnitude change would indicate the size of the target, and the frequency change would indicate the velocity of the target.

Figure 2:
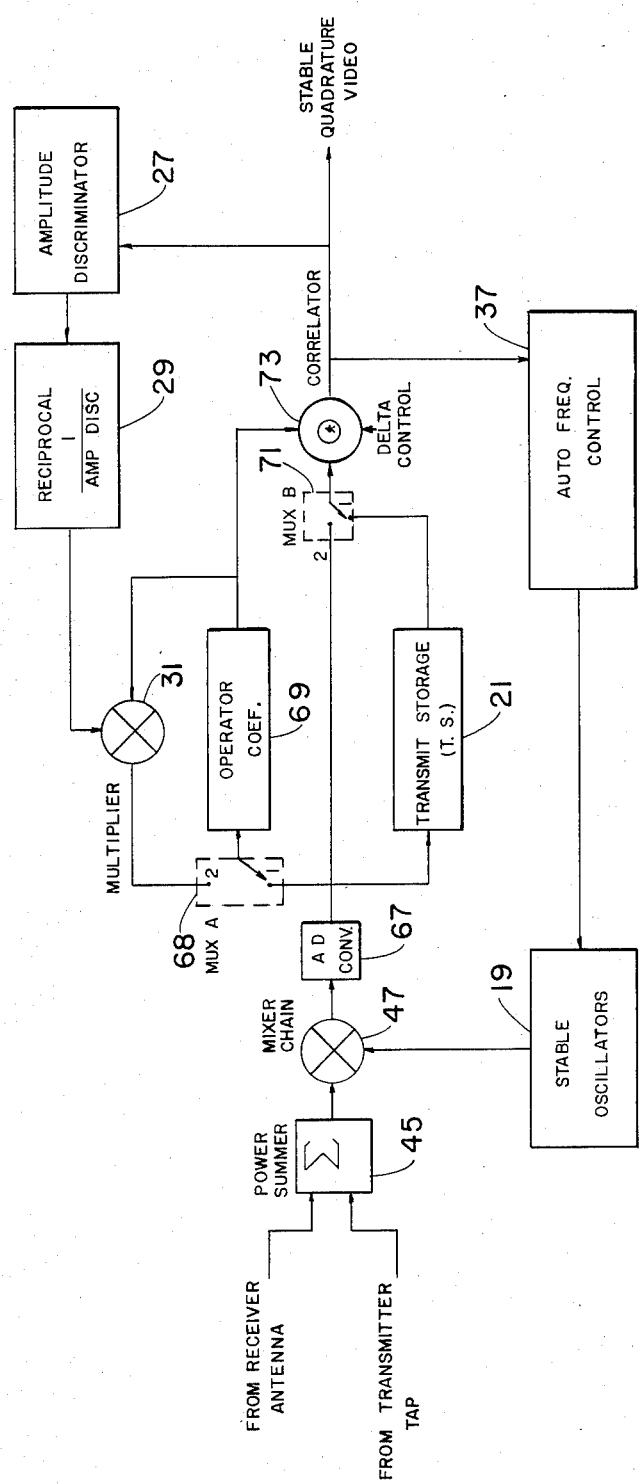
FIG. 2 is a block diagram of the preferred embodiment of a receiver which incorporates a digital stabilization unit constructed in accordance with this invention.
Figure 3:
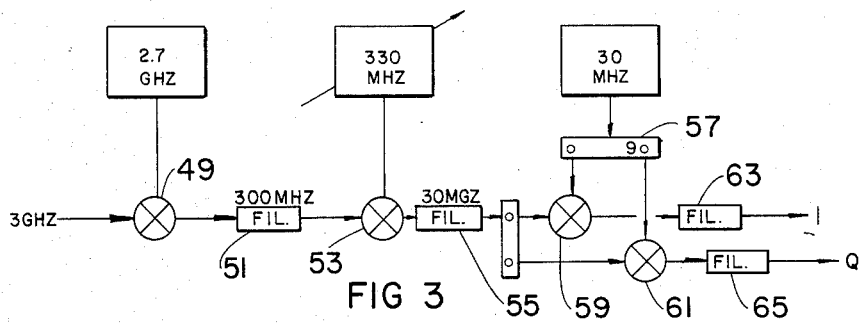
FIG. 3 is a block diagram illustrating the mixer chain employed in the working model of a digital stabilization unit of FIG. 2.

FIG. 2 illustrates the preferred embodiment, which functions as in FIG. 1, but uses some of the components for more than one function to reduce the total number of components required. Power sumer 45 adds the energy for both the transmitter tap and the receiver antenna. A signal will not be present on both taps at the same time. The power summer 45 applies the signal to a mixer chain 47. Mixer chain 47 is shown in more detail in FIG. 3. Assuming that the frequency of each transmit pulse is three gigahertz (GHZ), it is applied to a mixer 49 of conventional design which mixes it with a stable oscillator signal of 2.7 GHZ. The 2.7 GHZ signal cannot be varied at all. The result of the mixer is the sum and the difference of the two frequencies. A filter 51 filters out the sum, to leave only the 300 MHZ (megahertz) difference. This 300 MHZ difference is mixed with a variable oscillator signal that oscillates at 330 MHZ. Again, the sum and the difference result with the mixer 53, with a filter 55 filtering out the sum. This leaves a 30 MHZ signal which is split and applied, in phase, to two mixers 59 and 61. A fixed 30 MHZ oscillator is split and has one component applied, in phase, to mixer 59. Using a conventional circuit, the other component is shifted 90 degrees and applied as the second input to mixer 61. Again, the sum and the difference result from each, with the sums being filtered out by filters 63 and 65. The result is complex video, with an I or real component and a Q or a 90 degree out of phase of imaginary component. The oscillator means 19 (FIG. 2), includes all three oscillators, 2.7 GHZ, 330 MHZ and 30 MHZ, with the tunable portion being the 330 MHZ.

The complex video resulting from the mixer chain 47 is fed to a conventional high speed analog to digital converter 67. The A/D converter 67 presently operates at a 5 MHZ speed with a 10 bit capacity. This data is fed to the same transmit storage RAM 21 as shown in FIG. 1. The data is also fed through a multiplexer (MUX A) switch 68 to an operator coefficient RAM 69, which has more than one function. Initially, the data is fed in in time inverse order, with the operator coefficient circuit 69 serving as the FPOC 23 shown in FIG. 1.

A correlator 73 serves as all three of the correlators 25, 35 and 43 in FIG. 1. In the first mode, the correlator 73 operates as the correlator 25, by receiving information through a multiplexer switch (MUX B) 71 from the TS 21. This information is multiplied on a point by point basis with the data contained in the operator coefficient register 69 and accumulated. This yields an amplitude variable which is stored in the same amplitude discriminator 27. The programmable read only memory 29, upon reception of the amplitude variable, will provide a reciprocal to the multiplier 31.

Then, the MUX A switch 68 is changed from position 1 to position 2. The data from the operator coefficient register 69 is shifted through multiplier 31 and the scaled data is shifted back into the operator coefficient register 69, replacing the old information which was initially stored. Then, mode 3 occurs, which is the delta correlation mode. Correlator 73 will multiply the amplitude scaled information from the operator coefficient register 69 on a point by point basis with the information contained in the transmit storage register 21. MUX B 71 switch will remain in position 1 to allow this to occur. The correlator will subtract the second half of the products from the first half of the products, to yield a frequency error variable. This value is forwarded to the automatic frequency control circuit 37. The automatic frequency control circuit 37 maintains a running average of frequency error variables previously calculated, and averages the new value with them, forwarding the new average result to the stable oscillators 19. The automatic frequency control circuit 37 will subsequently tune the oscillator means 19 to bring the oscillator signals closer to the average transmitter frequency.

Mode 4 is the receiver mode, and in this position, the MUX B switch 71 will move to position 2. The receiver signal will pass through the power summer 45, mixer chain 47, be digitized by the A to D converter 67 and pass to the correlator 73. In this function, correlator 73 will act as correlator 43 of FIG. 1. Correlator 73 will multiply on a point by point basis the receiver data with the operator coefficient data contained in the operator coefficient register 69. The products will be summed or accumulated and provided as stable quadrature video, normalized to remove vagaries in the amplitude, phase, and frequency of the various transmit pulses. The system shown in FIG. 2 will continually cycle with each pulse.

The invention has significant advantages. It allows older radar installations using magnetron transmitters to be used as low level radar, without modifying the transmitters. It allows such a system to employ coherent signal processing techniques, such as Doppler processing, using an unstable transmitter. Also, the correction system can be incorporated into a radar system which has a stable transmitter in order to create an extremely stable system. A slight variation of this invention can be made to measure the amplitude, frequency and phase stability of existing transmitters, as well.

While the invention has been shown in only the theoretical embodiment and a single preferred embodiment, it should be apparent to those skilled in the art that it is not so limited but is susceptible to various changes without departing from the scope of the invention.

We claim:

1. A method of conditioning a received signal to account for vagaries in transmitted pulses, comprising in combination:

taking multiple samples across the transmitted pulse so as to preserve the amplitude, frequency and phase of said transmitted pulse;

from these samples, determining a set of numbers which can be multiplied point by point with the samples of the transmitted pulse to normalize for pulse to pulse variations in the amplitude, phase, and frequency of the transmitted pulse; and multiplying this set of numbers point by point with a like number of samples of the received signal to normalize the received signal to correct for vagaries of the transmit pulse, but preserve the amplitude and Doppler information of the received signal.

2. A method of conditioning radio frequency pulses received by a radar antenna, which are reflections of transmit pulses generated by a radar transmitter, to account for vagaries in the transmit pulse, comprising in combination:

providing a variable frequency stable signal close to a transmit frequency of the transmit pulse;

determining the difference in phase and frequency between the stable oscillator signal and the transmit pulse, and providing a real output and an imaginary output containing the phase and frequency difference and the amplitude of the transmit signal;

taking multiple samples of the real output and the imaginary output;

storing the samples;

from these stored samples, determining a set of numbers which can be multiplied point by point with the samples to normalize for pulse to pulse variations in the amplitude, phase, and frequency of the transmit pulse;

using a digital algorithm, determining the mean difference in frequency between the stable signal and a single transmitted pulse from said samples, averaging this mean difference with preceding mean differences determined to establish an average, and reducing the error between the average and the stable signal; and multiplying the set of numbers point by point with a like number of samples of the received signal to normalize the received signal and correct for vagaries of the transmit pulse while preserving the amplitude and Doppler information of the received signal.

3. A method of conditioning radio frequency pulses received by a radar antenna, reflected from transmit pulses generated by a radar transmitter, to account for vagaries in the transmit pulse, comprising in combination:

providing a variable frequency stable signal close to a transmit frequency of the transmit pulse;

determining the difference in phase and frequency between the stable signal and the transmit frequency, and providing an in phase real output and a 90 degree out of phase imaginary output containing the phase and frequency difference and the amplitude of the transmit pulse;

converting the real and imaginary outputs to digital data;

storing the digital data representing the real and imaginary outputs; also storing the digital data representing the real and imaginary outputs in a time reverse order; then multiplying the digital data representing the real and imaginary outputs times the digital data stored in time reverse order on a point by point basis to define a number of products, and accumulating the products to define an amplitude variable;

taking the reciprocal of the amplitude variable;

multiplying the reciprocal of the amplitude variable times the data stored in time reverse order to provide an amplitude, frequency and phase operator coefficient; then multiplying on a point for point basis the data representing the real and imaginary outputs times the data representing the amplitude, frequency, and phase operator coefficient to define a number of products, and separately accumulating the first half of these products and the second half of these products, then subtracting the accumulation of the one half from the accumulation of the other half to produce a frequency error variable;

averaging the frequency error variable over a number of prior transmit pulses and tuning the stable signal toward zero frequency difference with the average determined;

determining the phase difference between the stable signal and reflections arriving at the receiver antenna, and providing an in phase real receiver output and a 90 degree out of phase imaginary receiver output;

converting the receiver outputs to digital data representing the difference in phase and frequency between the stable signal and the received reflection, and the amplitude of the received reflection; and multiplying on a point by point basis the amplitude, frequency, phase operator coefficient times an equal number of sequential points from the real and imaginary receiver digital outputs, and accumulating the products for processing by a radar processor.

4. A system for providing to a radar processor stabilized receiver pulses received by a radar antenna and generated by a radar transmitter, which transmits pulses that may vary from one another in frequency, phase and amplitude, comprising in combination:

oscillator means for providing a variable frequency stable signal close to a frequency of the transmitted pulses;

phase detector means for determining the difference in frequency and phase between the stable oscillator signal and a transmit pulse, and for providing real and imaginary outputs containing the phase and frequency difference and the amplitude of the transmit signal;

transmit storage means for storing the real and imaginary outputs;

operator coefficient means for storing the real and imaginary outputs in time reverse order;

correlator means for multiplying the information contained in the transmit storage means times the information contained in the operator coefficient means on a point by point basis, defining a number of products, and accumulating the products to define an amplitude variable;

reciprocal means for taking the reciprocal of the amplitude variable;

multiplying means for multiplying the information contained in the operator coefficient means times the reciprocal of the amplitude variable, which provides an amplitude, frequency, phase operator coefficient;

the correlator means having delta correlating means for multiplying on a point for point basis the information in the transmit storage means times the operator coefficient, and for accumulating the first half of these products with the second half of these products, then subtracting the accumulation of the one half from the accumulation of the other half to produce a frequency error variable;

automatic frequency control means for averaging the frequency error variable over a large number of the transmit pulses and for tuning the oscillator means toward zero frequency difference with the average determined;

the phase detector means having receiver means for determining the phase difference between the oscillator means and reflections arriving at the receiver antenna, and for providing real and imaginary outputs;

the correlator means having receiver correlator means for multiplying the amplitude, frequency, phase operator coefficient times an equal number of sequential points from the real and imaginary outputs from the receiver means, and accumulating the output for processing by the radar processor.

5. The system according to claim 4 wherein the automatic frequency control means has means for sweeping the stable oscillator means across the available range if the amplitude variable is below a selected minimum.

6. A system for providing to a radar processor stabilized receiver pulses received by a radar antenna and generated by a radar transmitter, which transmits pulses that may vary from one another in frequency, phase and amplitude, comprising in combination:

oscillator means for providing a variable frequency stable signal close to a transmit frequency of the transmit pulses;

phase detector means for determining the difference in phase and frequency between the stable oscillator signal and a transmit pulse and for providing real and imaginary outputs containing the phase and frequency difference and the amplitude of the transmit pulse;

analog to digital converter means for converting the real and imaginary outputs to digital data;

transmit storage means for storing the digital data;

operator coefficient means for storing the digital data in time reverse order;

correlator means for multiplying the digital data contained in the transmit storage means times the data contained in the operator coefficient means on a point by point basis, defining a number of products, and accumulating the products to define an amplitude variable;

reciprocal means for taking the reciprocal of the amplitude variable;

multiplying means for multiplying the data in the operator coefficient means times the reciprocal of the amplitude variable, which provides an amplitude, frequency, phase operator coefficient;

the correlator means having delta correlating means for multiplying on a point for point basis that data in the transmit storage means times the operator coefficient and separately accumulating the first half of these products and the second half of these products, then subtracting the accumulation of one half from the accumulation of the other half to produce a frequency error variable;

automatic frequency control means for averaging the frequency error variable over a large number of the transmit pulses and for tuning the oscillator means toward zero frequency difference with the average determined;

the phase detector means having receiver means for determining the phase difference between the oscillator means and the reflections arriving at the receiver antenna, and for providing real and imaginary outputs containing the phase and frequency difference and the amplitude of the reflections;

the analog to digital converter means having means for converting the outputs of the receiver means to digital outputs;

the correlator means having receiver correlator means for multiplying the operator coefficient times an equal number of sequential points taken from the receiver outputs, and accumulating the products for use by the radar processor.

7. A method of monitoring radio frequency transmit pulses generated by a radar transmitter, to determine an amplitude variable and a frequency error variable in the transmit pulse, comprising in combination:

providing a variable frequency stable signal close to a transmit frequency of the transmit pulse;

determining the difference in phase and frequency between the stable signal and the transmit frequency, and providing an in phase real output and a 90 degree out of phase imaginary output containing the phase and frequency difference and which preserves the amplitude of the transmit pulse;

converting the real and imaginary outputs to digital data;

storing the digital data representing the real and imaginary outputs; also storing the digital data representing the real and imaginary outputs in a time reverse order; then multiplying the digital data representing the real and imaginary outputs times the digital data stored in time reverse order on a point by point basis to define a number of products, and accumulating the products to define an amplitude variable;

taking the reciprocal of the amplitude variable;

multiplying the reciprocal of the amplitude variable times the data stored in time reverse order to provide an amplitude, frequency and phase operator coefficient; then multiplying on a point for point basis the data representing the real and imaginary outputs times the data representing the amplitude, frequency, and phase operator coefficient to define a number of products, and separately accumulating the first half of these products and the second half of these products, then subtracting the accumulation of the one half from the accumulation of the other half to produce a frequency error variable.

8. A method of monitoring radio frequency transmit pulses generated by a radar transmitter, to determine an amplitude variable and a frequency error variable in the transmit pulse, comprising in combination;

providing a variable frequency stable signal close to a transmit frequency of the transmit pulse;

determining the difference in phase and frequency between the stable signal and the transmit frequency, and providing an in phase real output and a 90 degree out of phase imaginary output containing the phase and frequency difference and which preserves the amplitude of the transmit pulse;

converting the real and imaginary outputs to digital data;

storing the digital data representing the real and imaginary outputs; also storing the digital data representing the real and imaginary outputs in a time reverse order; then multiplying the digital data representing the real and imaginary outputs times the digital data stored in time reverse order on a point by point basis to define a number of products, and accumulating the products to define an amplitude variable;

taking the reciprocal of the amplitude variable;

multiplying the reciprocal of the amplitude variable times the data stored in time reverse order to provide an amplitude, frequency and phase operator coefficient; then multiplying on a point for point basis the data representing the real and imaginary outputs times the data representing the amplitude frequency and phase operator coefficient to define a number of products, and separately accumulating the first half of these products and the second half of these products, then subtracting the accumulation of the one half from the accumulation of the other half to produce a frequency error variable; then averaging the frequency error variable over a number of prior transmit pulses and tuning the stable signal toward zero frequency difference with the average determined.

* * * * *